Figure 1:
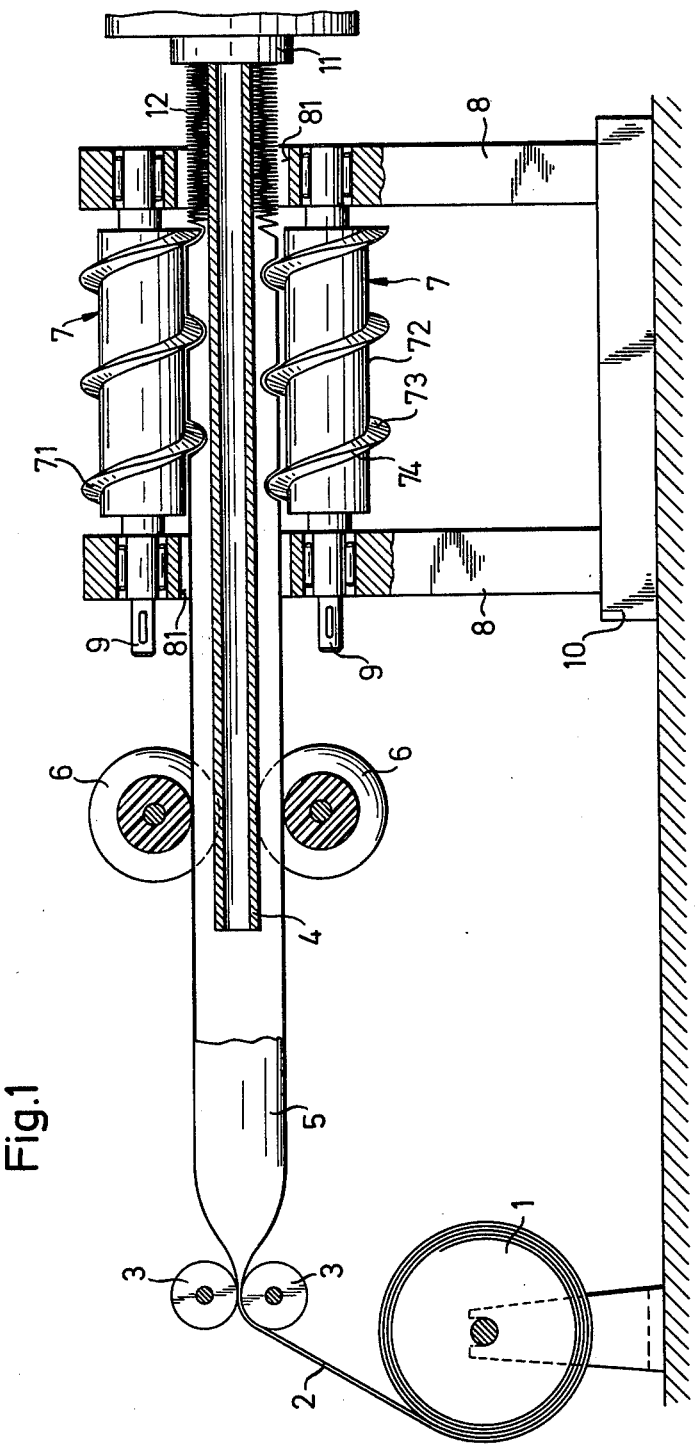

United States Patent [19]

Riegler et al.

[11] 4,001,914
[45] Jan. 11, 1977

[54] PROCESS AND APPARATUS FOR SHIRRING TUBULAR CASINGS

[75] Inventors: Ernst Riegler, Walluf; Heinrich Kron, Mainz-Mombach; Klaus-Jürgen Bittner, Wiesbaden-Biebrich,, Germany

[73] Assignee: Hoechst Aktiengesellschaft, Germany

[22] Filed: Feb. 26, 1974

[21] Appl. No.: 446,630

[30] Foreign Application Priority Data

Feb. 27, 1973 Germany .......................... 2309720

[52] U.S. Cl. ......................................... 17/42; 17/49
[51] Int. Cl.² ......................................... A22C 13/02
[58] Field of Search ................... 17/42, 41, 35, 1 F, 17/45, 49, 11; 138/118.1

[56] References Cited

UNITED STATES PATENTS

| | | | |
|---|---|---|---|
| 1,302,194 | 4/1919 | Mayer ................................. | 17/42 |
| 2,984,574 | 5/1961 | Matecki .............................. | 17/42 |
| 3,594,857 | 7/1971 | Horst ................................. | 17/42 |
| 3,629,902 | 12/1971 | Leonard ............................. | 17/11 |

FOREIGN PATENTS OR APPLICATIONS

| | | | |
|---|---|---|---|
| 537,706 | 3/1957 | Canada ............................... | 17/42 |
| 302,087 | 6/1971 | U.S.S.R. ............................. | 17/42 |

Primary Examiner—Russell R. Kinsey
Assistant Examiner—James D. Hamilton
Attorney, Agent, or Firm—James E. Bryan

[57] ABSTRACT

This invention relates to an improvement in the process for shirring cylindrical tubular casings, especially artificial sausage casings of synthetic material, in which an inflated casing is conveyed in the direction of its longitudinal axis and shirred, with pleating, against a counter-force by shirring forces acting upon the circumference of the casing, the improvement comprising that the forces acting upon the surface of the casing do so continuously and simultaneously, at equal intervals, at a plurality of points on at least two straight lines extending parallel to and symmetrically about the longitudinal axis of the casing, the action being at right angles to the longitudinal axis of the casing, and, simultaneously, in the direction of the longitudinal axis of the casing, against the counter-force. The invention also relates to an apparatus for performing the process.

12 Claims, 3 Drawing Figures

PROCESS AND APPARATUS FOR SHIRRING TUBULAR CASINGS

This invention relates to a process for shirring tubular casings of synthetic material and having a circular cross-section, especially casings made of regenerated cellulose.

Further, the invention relates to an apparatus for performing the shirring process.

Tubular casings of synthetic material, in particular of regenerated cellulose, are widely used as artificial sausage casings. In order to fill them with sausage meat by means of a sausage filler, the artificial sausage casings are normally used in the form of shirred casings, the so-called "sticks." The folded and shirred sausage casing forms a rigid, tubular hollow body.

When the sausage casing is to be filled with sausage meat, the stick is pushed onto the spout of a sausage filler of known type and the sausage meat is forced through the spout into the stick, the other end of which is closed, so that the shirred sausage casing forming the stick is continuously unfolded.

Various processes and apparatuses for shirring sausage casings are known. According to one of these known processes, the sausage casing is inflated with air and slipped onto a mandrel provided with an abutment, where it is compressed and pushed together, with fold formation, by bringing the outer surface of the sausage casing positioned on the mandrel in frictional contact with the surface or surfaces of one or more driven rollers or cogwheels symmetrically arranged about and around the mandrel. Due to their rotational motion, in the direction of feed of the sausage casing only, the sausage casing is pushed against the abutment at the end of the mandrel and pleated.

The known processes and apparatuses for shirring tubular casings have the disadvantage, however, that a satisfactory rigidity of the stick, which is required for further processing, can only be achieved by an additional process step which follows the shirring step, and during which the stick is at least once further compressed to increase its compression rate.

Further, the known apparatuses have the disadvantage that for shirring sausage casings of different sizes, different shirring elements have to be used which are adapted to the different circumferences of the casings.

It is the object of the present invention to overcome the disadvantages of the known processes and apparatuses and to enable the production of sufficiently rigid and substantially uniformly pleated sticks without the hitherto necessary re-pressing of the casings and without having to replace the shirring elements of the apparatus when different sizes of casings are to be shirred.

This object is achieved by a process for shirring cylindrical tubular casings, in particular artificial sausage casings of synthetic material, wherein the inflated casing is conveyed in the direction of its longitudinal axis and is shirred, with pleating, against a counterforce, by means of a shirring element exerting shirring forces which act upon the circumference of the casing. In the process of the invention, the forces bearing upon the surface of the tubular casing act continuously and simultaneously, at equal intervals, upon a plurality of points lying on at least two straight lines which extend parallel to and symmetrically about the longitudinal axis of the casing, the direction of their action being at right angles to the longitudinal axis of the sausage casing and, at the same time, in the direction of the longitudinal axis of the casing, against a counter-force.

The apparatus according to the invention for shirring the tubular casing comprises a hollow mandrel with an abutment at one of its ends, against which the casing is pressed in the folded state during shirring, and shirring elements arranged laterally from the mandrel. The shirring elements are at least two worms which are mounted for rotation and whose longitudinal axes extend parallel to or at an acute angle to the longitudinal axis of the mandrel and are symmetrically arranged about it. The worms are so constructed and fixedly mounted relative to the mandrel that the distance between the teeth of the worms and the surface of the mandrel is such that the teeth engage the tubular casing and compress it during performance of the shirring process.

The shirring element may be, e.g., a straight cylindrical bar, i.e. a worm shaft, upon whose surface an uninterrupted, helically wound projection of uniform height is arranged. This projection forms the teeth of the worm.

The teeth of the worm have two flanks and a ridge. Advantageously, the worms of single-thread construction, but multiple-thread worms also may be used.

Cylindrical worms are preferred, but worms of conical construction may also be used. If conical worms are used, they should be mounted in such a manner that their longitudinal axes extend at an acute angle to the longitudinal axis of the mandrel and the tapering end of the worm is in the direction of the abutment at the end of the mandrel. It is also possible to use both cylindrical and conical worms in one and the same apparatus. The term "cylindrical" as used in this connection means that the outer diameter of the worm remains constant over its entire length.

The distance between the teeth of the worm, i.e. the so-called "pitch," is either constant or differs from tooth to tooth. The height of the teeth should be so selected that the tubular casing does not touch the core of the worm during the shirring operation, whereas the teeth of the worm grip the tubular casing and compress it, and the ridges of the teeth pass the shirring mandrel as closely as possible. By their rotation about their longitudinal axes, the worms exert a shirring action upon the casing.

In a particularly advantageous embodiment of the apparatus according to the invention, the shirring device includes more than two, preferably three, four, or even eight rotatable screw conveyors, which are mounted parallel to and symmetrically about the longitudinal axis of the mandrel.

The screws may be supported at both ends or they may be overhung.

For performing the process of the invention, the casing to be shirred, for example a cellulose hydrate casing, is inflated to its full diameter by a slight overpressure and is slipped in known manner over one end of a hollow mandrel provided, at its other end, with an abutment for the shirred tubular casing. With the aid of at least two driven worms which are mounted for rotation and parallel to the longitudinal axis of the mandrel, in radial distance from it and whose teeth are in frictional contact with the inflated casing slipped on the mandrel and compress it, the casing is gripped by the teeth of the rotating worms and conveyed to the abutment at the end of the mandrel where it is shirred to form a "stick." Advantageously, the shirring forces are applied to the surface if the casing by means of three, four, or eight worms which are symmetrically arranged about the longitudinal axis of the mandrel.

For performing the inventive process, all worms must rotate in the same direction and all must be constructed in such a manner that they are all either left-handed or right-handed.

In the case of single-thread worms, the worms are preferably arranged in such a manner that the points at which the casing is consecutively gripped by the teeth of the worm are offset along a helical line corresponding to the pitch of the worm. In this manner, the rigidity of the stick is improved.

In the shirring region, the casing may be laterally fixed in that the surface of the casing extending between two worms is supported by means of guide elements, e.g. grooved guide pulleys or baffles.

The invention will be further illustrated by reference to the accompanying drawings, but it is not intended to limit it to the particular embodiment shown.

Figure 2:
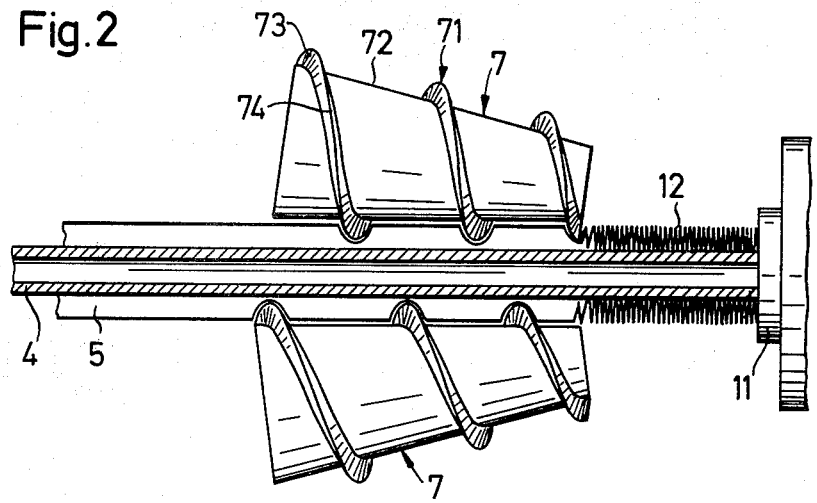
Figure 3:
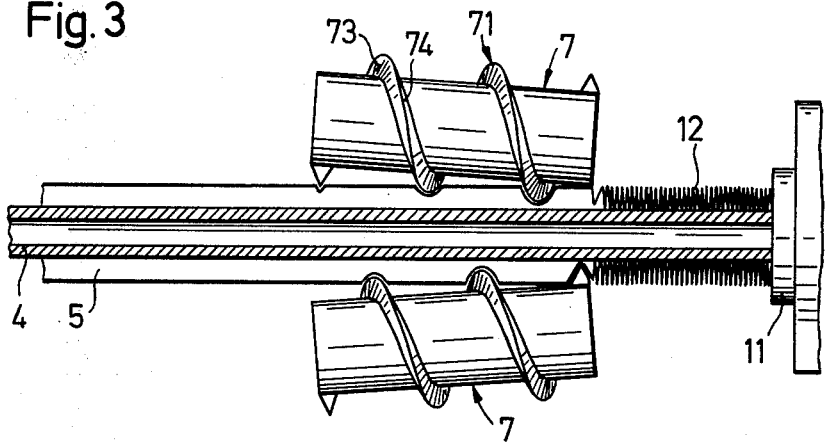

FIG. 1 is a diagrammatic side elevation, in longitudinal section, of one embodiment of the apparatus of the invention, FIG. 2 is a fragmentary view of another embodiment of an apparatus according to the invention, and FIG. 3 is a fragmentary view of yet another embodiment of an apparatus according to the invention.

In FIG. 1, the longitudinal axes of four cylindrical worms supported at both ends extend parallel to and symmetrically about the axis of the mandrel.

In the embodiment in the drawing, only two of a total of four worms are visible in the sectional view.

In FIG. 2 the longitudinal axes of the worms form an acute angle with the longitudinal axis of the mandrel and the worms taper in the direction of feed. By this construction, the teeth of the worm engage the tubular casing and compress it, although the axis of the worm is at an acute angle with the longitudinal axis of the mandrel.

In FIG. 3 the longitudinal axes of the screws also extend at an acute angle to the longitudinal axis of the mandrel, but in this case the screws are cylindrical.

In the apparatus shown in FIG. 1, the tubular casing to be shirred is withdrawn from a supply roll 1 on which it is wound in the forms of a collapsed tube 2. The tube 2 is then passed between a pair of rotatable squeeze rollers 3 and is then slipped over the end of the hollow shirring mandrel 4 whose other end is provided with an abutment 11. The mandrel provided with the abutment is so mounted that it may be pivoted in the horizontal direction, by means of a mechanism not shown in the drawing. In known manner, air is blown into the tube through the hollow mandrel, which causes a slight overpressure in the tube and inflates it to its full diameter. A pair of rotatable supporting and feed rollers 6 transports the tube to the rotatable worms 7, which are supported at both ends and serve as shirring elements.

In the drawings, the numeral 71 designates a tooth of a worm, 72 designates the cylindrical core of the worm, 73 designates one of the flanks and 74 designates the ridge of a tooth.

The worms 7, which are supported at both end in the bearing brackets 8, are individually driven through the shafts 9 by driving means not shown in the drawing, e.g. by pinions, gear chains, drive shafts and the like. The bearing brackets 8 have openings 81 therein and are mounted on a base plate 10 which is secured to a frame (not shown).

Advantageously, the worms should be offset around the inflated tube 5 in such a manner that the tube is engaged by the individual teeth of the worms along a spiral path. The pitch of the spiral path should correspond to the pitch of the worms used in a particular case. In this manner, the inflated tube is spirally preformed in the area where it is engaged by the worms and is consecutively and section-wise pushed against the abutment 11, which acts as the counter-force, or against the already shirred portion of the tube 12, with continuous fold formation.

When the worms 7 are not offset relative to each other, so that sections of the tub 5 are not engaged consecutively, but simultaneously at the circumference of the tube by the worms and laid in folds, sticks are produced which are also quite acceptable.

In the FIGS. 2 and 3, the numerals 4, 5, 7, 71, 72, 73, 74, 11, and 12 have the same meanings as in FIG. 1.

In FIG. 2, the screw is of conical construction, and in FIG. 3 a cylindrical screw is employed. In both cases, the longitudinal axes of the screws form an acute angle with the axis of the mandrel and are arranged symmetrically about it.

It will be obvious to those skilled in the art that many modifications may be made within the scope of the present invention without departing from the spirit thereof, and the invention includes all such modifications.

What is claimed is:

1. In the process for shirring cylindrical tubular casings, especially artificial sausage casing of synthetic material, in which an inflated casing is conveyed in the direction of its longitudinal axis and shirred, with pleating, against a counter-force by shirring forces acting upon the circumference of the casing, the improvement which comprises that the forces acting upon the surface of the casing do so continuously and simultaneously, at equal intervals, at a plurality of points on at least two straight lines extending parallel to and symmetrically about the longitudinal axis of the casing, the action of said forces being at right angles to the longitudinal axis of the casing, and, simultaneously, in the direction of the longitudinal axis of the casing, against said counter-force.

2. A process according to claim 1 in which said forces act upon the surface of the casing at a plurality of points on four straight lines symmetrically positioned about the longitudinal axis of the casing.

3. A process according to claim 1 in which said forces act upon the surface of the casing at a plurality of points on eight straight lines symmetrically positioned about the longitudinal axis of the casing.

4. A process according to claim 1 in which said forces act upon the surface of the casing at a plurality of points on three straight lines symmetrically positioned about the longitudinal axis of the casing.

5. In an apparatus for shirring and pleating tubular casings, including a hollow cylindrical mandrel having an abutment at one end thereof, shirring elements symmetrically mounted about the mandrel, means for squeezing a tube before it passes onto the mandrel, and menas for conveying the tube to the mandrel, the improvement which comprises at least two shirring worm means symmetrically mounted about the mandrel, the axes of the worm means extending parallel to the axis of said mandrel, said worm means being so constructed and mounted relative to the mandrel that the distance between the teeth of the worms and the surface of the mandrel is such that the teeth engage the inflated tubular casing and compress it during the shirring operation, and means for rotating said worm means.

6. An apparatus according to claim 5 in which the longitudinal axes of said worm means are at an acute angle to the longitudinal axis of said mandrel.

7. An apparatus according to calim 5 in which said worm means are conical.

8. An apparatus according to claim 5 in which said worm means are cylindrical.

9. An apparatus according to claim 5 including three shirring worm means.

10. An apparatus according to claim 5 including four shirring worm means.

11. An apparatus according to claim 5 including eight shirring worm means.

12. An apparatus according to claim 5 including guide element means between said shirring worm means.

* * * * *